United States Patent
Huang et al.

(10) Patent No.: US 11,722,692 B2
(45) Date of Patent: Aug. 8, 2023

(54) HISTORY-BASED MOTION VECTOR PREDICTOR CONSTRAINT FOR MERGE ESTIMATION REGION

(71) Applicant: QUALCOMM Incorporated, San Diego, CA (US)

(72) Inventors: Han Huang, San Diego, CA (US); Wei-Jung Chien, San Diego, CA (US); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 339 days.

(21) Appl. No.: 17/136,983

(22) Filed: Dec. 29, 2020

(65) Prior Publication Data
US 2021/0203982 A1 Jul. 1, 2021

Related U.S. Application Data

(60) Provisional application No. 62/955,977, filed on Dec. 31, 2019.

(51) Int. Cl.
*H04N 19/58* (2014.01)
*H04N 19/167* (2014.01)
*H04N 19/176* (2014.01)
*H04N 19/105* (2014.01)
(Continued)

(52) U.S. Cl.
CPC .......... *H04N 19/58* (2014.11); *H04N 19/105* (2014.11); *H04N 19/139* (2014.11); *H04N 19/167* (2014.11); *H04N 19/176* (2014.11); *H04N 19/436* (2014.11)

(58) Field of Classification Search
CPC .... H04N 19/58; H04N 19/105; H04N 19/139; H04N 19/167; H04N 19/176; H04N 19/436
See application file for complete search history.

(56) References Cited

U.S. PATENT DOCUMENTS

| | | | | |
|---|---|---|---|---|
| 2020/0021839 A1* | 1/2020 | Pham Van | ........... | H04N 19/436 |
| 2020/0077084 A1* | 3/2020 | Li | ........... | H04N 19/105 |
| 2020/0077115 A1* | 3/2020 | Li | ........... | H04N 19/44 |

(Continued)

FOREIGN PATENT DOCUMENTS

WO  WO-2020088690 A1 *  5/2020  ........... H04N 19/109

OTHER PUBLICATIONS

Bossen F., et al., "JVET Common Test Conditions and Software Reference Configurations for SDR Video," Joint Video Experts Team (JVET) of ITU-T SG 16 WP 3 and ISO/IEC JTC 1/SC 29/WG 11, 14th Meeting, Geneva, CH, Mar. 19-27, 2019, JVET-N1010-v1, pp. 1-6.

(Continued)

*Primary Examiner* — Jeremiah C Hallenbeck-Huber
(74) *Attorney, Agent, or Firm* — Shumaker & Sieffert, P.A.

(57) ABSTRACT

A device for decoding video data can be configured to store a table of history-based motion vector predictors (HMVPs); determine motion information for a first block of the video data; add the motion information for the first block to the table of HMVPs in response to determining that the first block is located at a bottom-right corner of a motion estimation region (MER); and use the table of HMVPs to decode a second block of the video data.

23 Claims, 8 Drawing Sheets

(51) Int. Cl.
H04N 19/139 (2014.01)
H04N 19/436 (2014.01)

(56) References Cited

U.S. PATENT DOCUMENTS

2020/0186807 A1* 6/2020 Seregin ............... H04N 19/423
2021/0400298 A1* 12/2021 Zhao ................... H04N 19/513

OTHER PUBLICATIONS

Bross B., et al., "Versatile Video Coding (Draft 10)," JVET-S2001-vH, Joint Video Experts Team (JVET) of ITU-T SG 16 WP 3 and ISO/IEC JTC 1/SC 29/WG 11, 19th Meeting: by teleconference, Jun. 22-Jul. 1, 2020, 551 Pages.
Bross B., et al., "Versatile Video Coding (Draft 7)," 16th JVET Meeting, Oct. 1, 2019-Oct. 11, 2019, Geneva, (The Joint Video Exploration Team of ISO/IEC JTC1/SC29/WG11 and ITU-T SG. 16 WP 3), No. JVET-P2001-vE, Nov. 12, 2019 (Nov. 12, 2019), XP030224328, 494 pages, Retrieved from the Internet: URL: http://phenix.int-evry.fr/jvet/doc_end_user/documents/16_Geneva/wg11/JVET-P2001-v14.zip JVET-P2001-vC.docx, [retrieved on Nov. 12, 2019], paragraphs [9.3.3.2], [9.3.3.6], [9.3.3.14], table 124.
Esenlik (Huawei) S., et al., "AHG16: Parallel Merge Estimation for VVC," 17th JVET Meeting, Jan. 7, 2020-Jan. 17, 2020, Brussels, (The Joint Video Exploration Team of ISO/IEC JTC1/SC29/WG11 and ITU-TSG.16 WP 3), No. JVET-Q0356, Dec. 31, 2019 (Dec. 31, 2019), XP030223304, pp. 1-9, Retrieved from the Internet: URL:http://phenix.int-evry.fr/jvet/doc_end_user/documents/17_Brussels/wg11/JVET-Q0356-v1.zip JVET-Q0356.docx [retrieved on Dec. 31, 2019] the Whole Document.
Esenlik (Huawei) S, et al., "Non-CE4: Parallel Merge Estimation for WC," 12. Jvet Meeting; Oct. 3, 2018-Oct. 12, 2018; Macao, (The Joint Video Exploration Team of ISO/IEC JTC1/SC29/WG11 and ITU-TSG.16 ) No. JVET-L0216, Oct. 5, 2018 (Oct. 5, 2018), XP030251166, 7 pages, Retrieved from the Internet: URL:http://phenix.int-evry.fr/jvet/doc_end_user/documents/12_Macao/wg11/JVET-L0216-v2.zip JVET-L0216.docx [retrieved on Oct. 5, 2018] pp. 3, 4, paragraph 3.
Gao (Huawei) H., et al., "CE4: Parallel Merge Estimation for VVC (CE4.3.2)," Jan. 9, 2019-2019011, JVET-M0289, Joint Video Experts Team (JVET) of ITU-T SG 16 WP 3 and ISO/IEC JTC 1/SC 29/WG 11, 13th Meeting, Marrakech, MA, Jan. 9-18, 2019, pp. 1-11, XP030200264, Retrieved from the Internet: URL:http://phenix.int-evry.fr/jvet/doc_end_user/documents/13_Marrakech/wg11/JVET-M0289-v1.zip JVET-M0289 v1.docx [retrieved on Jan. 2, 2019] Abstract; Figures 1-3 Paragraphs [0001] - [0003].
Hsiao Y-L., et al., "AHG16: On Merge Estimation Region for VVC," Jan. 7, 2020-Jan. 17, 2020, JVET-Q0185-V1, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-8, .Dec. 30, 2019 (Dec. 30, 2019), XP030222823, Retrieved from the Internet: URL:http://phenix.int-evry.fr/jvet/doc_end_user/documents/17_Brussels/wg11/JVET-Q0185-v1.zip JVET-Q018S-v1.docx [retrieved on Dec. 30, 2019] the Whole Document, pp. 1-3.
Huang H., et al., "AHG16: Merge Estimation Region with Constraint in HMVP Update," JVET-Q0297, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-11.
International Search Report and Written Opinion—PCT/US2020/067476—ISA/EPO—dated Feb. 22, 2021 (1414-955WO01/201633WO) 13 Pages.
ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.
Wang Y-K., et al., "AHG2: Editorial Input on WC Draft Text," JVET-Q0041-v2, Joint Video Experts Team (JVET) of ITU-T SG 16 WP 3 and ISO/IEC JTC 1/SC 29/WG 11, 17th Meeting: Brussels, BE, Jan. 7-17, 2020, 2 Pages.

* cited by examiner

HISTORY-BASED MOTION VECTOR PREDICTOR CONSTRAINT FOR MERGE ESTIMATION REGION

This application claims the benefit of U.S. Provisional Patent Application 62/955,977, filed 31 Dec. 2019, the entire content of each being incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

A merge estimation region (MER) generally refers to a region of one or more blocks, in which a video encoder and video decoder may derive merge candidate lists for the blocks of the region in parallel. As will be explained in greater detail below, existing implementations of history-based motion vector predictors (HMVPs) may prevent the parallelization of merge candidate list derivation achieved using MERs. Thus, existing implementations of HMVP may not be able to be used in conjunction with MERs. This disclosure describes techniques for maintaining an HMVP table in a manner that may enable HMVP to be used in conjunction with MER. More specifically, by adding the motion information for a block to a table of HMVPs in response to determining that the first block is located at a bottom-right corner of a MER, a video encoder and video decoder may be able to simultaneously implement HMVP while at the same time achieving the parallelization of MER.

According to one example, a method for decoding video data includes storing a table of history-based motion vector predictors (HMVPs); determining motion information for a first block of the video data; adding the motion information for the first block to the table of HMVPs in response to determining that the first block is located at a bottom-right corner of a motion estimation region (MER); and using the table of HMVPs to decode a second block of the video data.

According to another example, a device for decoding video data includes a memory configured to store video data and one or more processors implemented in circuitry and configured to store a table of history-based motion vector predictors (HMVPs); determine motion information for a first block of the video data; add the motion information for the first block to the table of HMVPs in response to determining that the first block is located at a bottom-right corner of a motion estimation region (MER); and use the table of HMVPs to decode a second block of the video data.

According to another example, computer-readable storage medium storing instructions that when executed by one or more processors cause the one or more processors to store a table of history-based motion vector predictors (HMVPs); determine motion information for a first block of the video data; add the motion information for the first block to the table of HMVPs in response to determining that the first block is located at a bottom-right corner of a motion estimation region (MER); and use the table of HMVPs to decode a second block of the video data.

According to another example, an apparatus for decoding video data includes means for storing a table of history-based motion vector predictors (HMVPs); means for determining motion information for a first block of the video data; means for adding the motion information for the first block to the table of HMVPs in response to determining that the first block is located at a bottom-right corner of a motion estimation region (MER); and means for using the table of HMVPs to decode a second block of the video data.

The details of one or more examples are set forth in the accompanying drawings and the description below. Other features, objects, and advantages will be apparent from the description, drawings, and claims.

DETAILED DESCRIPTION

Figure 1:
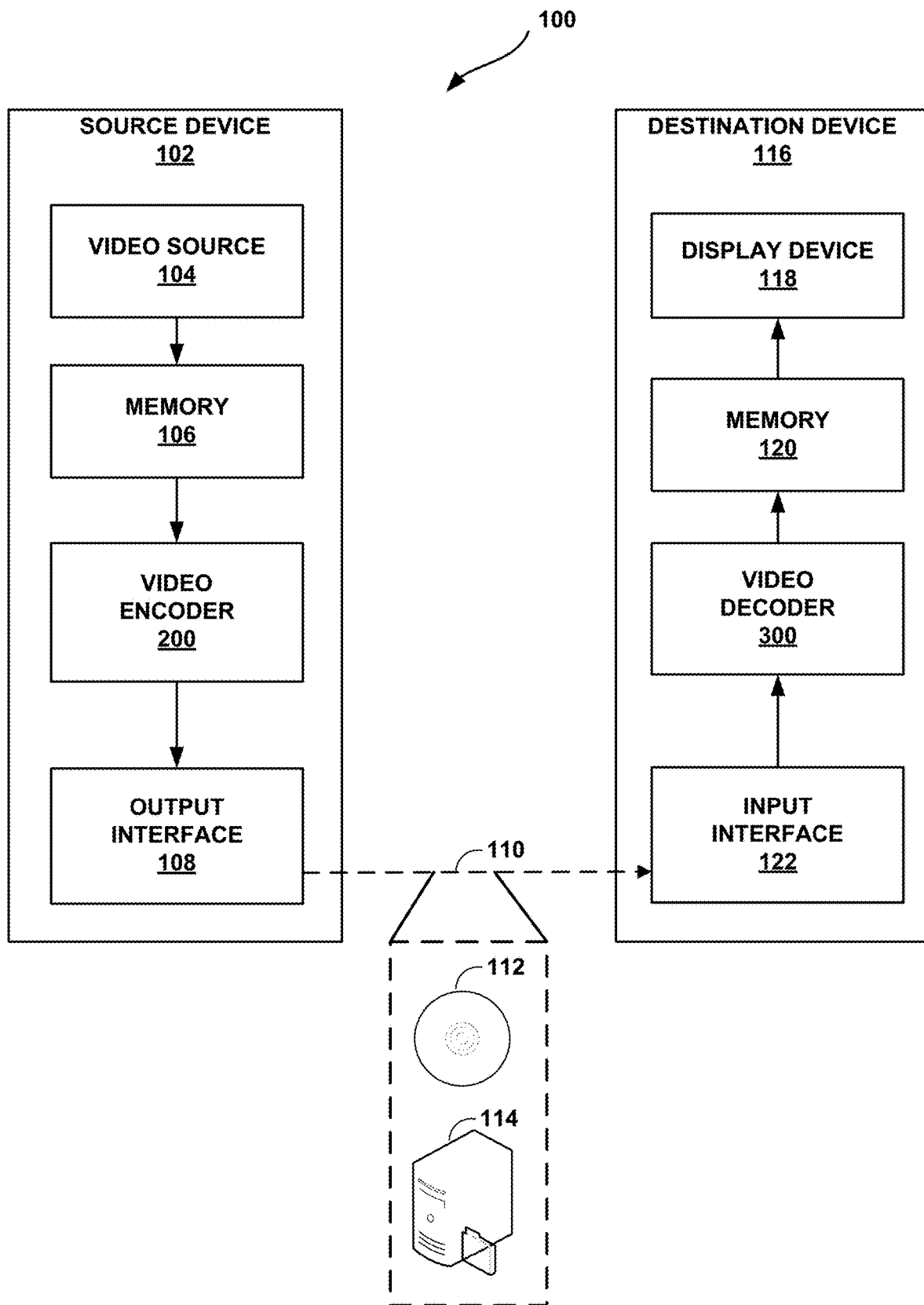
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

As will be described in more detail below, when coding a block of video data using inter prediction, a video encoder and video decoder may be configured to code the block in various modes. One such mode is merge mode. In merge mode, a video encoder and video decoder are configured to generate a list of merge candidates, where each merge candidate in the list includes motion information for predicting a block. The motion information may, for example, include one or more motion vectors and one or more reference picture identifies.

By implementing the same list generation process and only using available information from already coded blocks, a video encoder and video decoder can be configured to generate the same lists with the same merge candidates in the same order. Thus, for a video encoder to signal motion information in merge mode, the video encoder can include in the encoded bitstream an index identifying one of the merge candidates. As the video decoder has constructed the same list as the video encoder, the video decoder can determine the motion information associated with the merge candidate associated with the received index. In merge mode, the video decoder determines a predictive block based on the motion information associated with the merge candidate associated with the received index.

The video encoder and video decoder may generate the list of merge candidates for a block by adding, in a predefined order, the motion information of spatially neighboring blocks in the same picture as the block, co-located blocks in different pictures, artificially generated candidates, default candidates, or other such candidates. In some instances, the video encoder and video decoder may also be configured to add history-based candidates that include previously used motion information that may not correspond to spatially neighboring blocks or co-located blocks. To determine the history-based candidate, the video encoder and video decoder may each maintain, e.g., store and update, a history-based motion vector prediction (HMVP) table. The video encoder and video decoder may store a predefined number of motion vectors in the HMVP table. As new motion vectors are added to the HMVP table, older motion vectors may be removed (e.g., in a first-in, first-out fashion). In some circumstances, the video encoder and video decoder may be configured to add the motion information of an entry from the HMVP table to the list of merge candidates for a merge coded video block.

A video encoder and video decoder may also be configured to code blocks using merge estimation regions (MERs) in a picture of video data. A video encoder and/or video decoder may be configured to perform a merge mode motion vector prediction process (e.g., motion vector predictor list construction such as merge candidate list construction) in parallel for a plurality of blocks (e.g., coding units) that are within a MER.

As will be explained in greater detail below, existing implementations of HMVP may prevent the parallelization of merge candidate list derivation achieved using MERs. Thus, existing implementations of HMVP may not be able to be used in conjunction with MERs. This disclosure describes techniques for maintaining an HMVP table in a manner that may enable HMVP to be used in conjunction with MER. More specifically, by adding the motion information for a block to a table of HMVPs in response to determining that the first block is located at a bottom-right corner of a motion estimation region, a video encoder and video decoder may be able to simultaneously implement both HMVP and MER.

As used in this disclosure, the term video coding generically refers to either video encoding or video decoding. Similarly, the term video coder may generically refer to a video encoder or a video decoder. Moreover, certain techniques described in this disclosure with respect to video decoding may also apply to video encoding, and vice versa. For example, often times video encoders and video decoders are configured to perform the same process, or reciprocal processes. For example, both a video encoder and a video decoder may be configured to use the same rules for generating HMVP tables, such that both the video encoder and video decoder can maintain the same HMVP tables without the need for any significant signaling overhead. Also, a video encoder typically performs video decoding (also called reconstruction) as part of the processes of determining how to encode video data.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for updating HMVP tables disclosed herein. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for updating HMVP tables disclosed herein. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or nonvolatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Video encoder 200 and video decoder 300 may additionally or alternatively operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 7)," Joint Video Experts Team (JVET) of ITU-T SG 16 WP 3 and ISO/IEC JTC 1/SC 29/WG 11, 16$^{th}$ Meeting: Geneva, CH, 1-11 Oct. 2019, JVET-P2001-v14 (hereinafter "VVC Draft 7"). Another draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 18$^{th}$ Meeting: by teleconference, 22 Jun.-1 Jul. 2020, JVET-S2001-v17 (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder

200 may predict the current CU using uni-directional prediction or bi-directional prediction.

Video encoder 200 may signal motion parameters of a block in various ways. Such motion parameters may include motion vectors, reference indexes, reference picture list indicators, and/or other data related to motion. In some examples, video encoder 200 and video decoder 300 may use motion prediction to reduce the amount of data used for signaling motion parameters. Motion prediction may comprise the determination of motion parameters of a block (e.g., a PU, a CU, etc.) based on motion parameters of one or more other blocks. There are various types of motion prediction. For instance, merge mode and advanced motion vector prediction (AMVP) mode are two types of motion prediction.

In merge mode, video encoder 200 generates a candidate list. The candidate list includes a set of candidates that indicate the motion parameters of one or more source blocks. The source blocks may spatially or temporally neighbor a current block. Furthermore, in merge mode, video encoder 200 may select a candidate from the candidate list and may use the motion parameters indicated by the selected candidate as the motion parameters of the current block. Video encoder 200 may signal the position in the candidate list of the selected candidate. Video decoder 300 may determine, based on information obtained from a bitstream, the index into the candidate list. In addition, video decoder 300 may generate the same candidate list and may determine, based on the index, the selected candidate. Video decoder 300 may then use the motion parameters of the selected candidate to generate a predictor block for the current block.

Skip mode is similar to merge mode. In skip mode, video encoder 200 and video decoder 300 generate and use a candidate list in the same way that video encoder 200 and video decoder 300 use the candidate list in merge mode. However, when video encoder 200 signals the motion parameters of a current block using skip mode, video encoder 200 does not signal any residual data for the current block. Accordingly, video decoder 300 may determine a predictor block for the current block based on one or more reference blocks indicated by the motion parameters of a selected candidate in the candidate list. Video decoder 300 may then reconstruct samples in a coding block of the current block such that the reconstructed samples are equal to corresponding samples in the predictor block of the current block.

AMVP mode is similar to merge mode in that video encoder 200 may generate a candidate list for a current block and may select a candidate from the candidate list. However, for each respective reference block used in determining a predictor block for the current block, video encoder 200 may signal a respective motion vector difference (MVD) for the current block, a respective reference index for the current block, and a respective candidate index indicating a selected candidate in the candidate list. An MVD for a block may indicate a difference between a motion vector of the block and a motion vector of the selected candidate. The reference index for the current block indicates a reference picture from which a reference block is determined.

Furthermore, when AMVP mode is used, for each respective reference block used in determining a predictor block for the current block, video decoder 300 may determine an MVD for the current block, a reference index for the current block, and a candidate index and a motion vector prediction (MVP) flag. Video decoder 300 may generate the same candidate list and may determine, based on the candidate index, a selected candidate in the candidate list. As before, this candidate list may include motion vectors of neighboring blocks that are associated with the same reference index as well as a temporal motion vector predictor which is derived based on the motion parameters of the neighboring block of the co-located block in a temporal reference picture. Video decoder 300 may recover a motion vector of the current block by adding the MVD to the motion vector indicated by the selected AMVP candidate. That is, video decoder 300 may determine, based on a motion vector indicated by the selected AMVP candidate and the MVD, the motion vector of the current block. Video decoder 300 may then use the recovered motion vector or motion vectors of the current block to generate predictor blocks for the current block.

When a video coder (e.g., video encoder 200 or video decoder 300) generates an AMVP candidate list for a current block, the video coder may derive one or more AMVP candidates based on the motion parameters of reference blocks (e.g., spatially-neighboring blocks) that contain locations that spatially neighbor the current PU and one or more AMVP candidates based on motion parameters of PUs that temporally neighbor the current PU. The candidate list may include motion vectors of reference blocks that are associated with the same reference index as well as a temporal motion vector predictor which is derived based on the motion parameters (i.e., motion parameters) of the neighboring block of the co-located block in a temporal reference picture. A candidate in a merge candidate list or an AMVP candidate list that is based on the motion parameters of a reference block that temporally neighbors a current block. This disclosure may use the term "temporal motion vector predictor" to refer to a block that is in a different time instance than the current block and is used for motion vector prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using AMVP or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
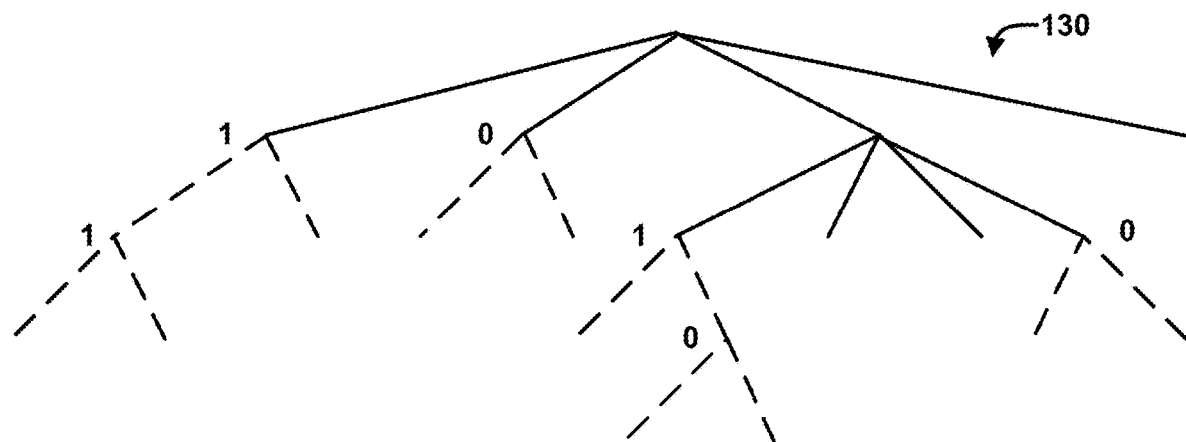
FIGS. 2A and 2B are conceptual diagrams illustrating an example quadtree binary tree (QTBT) structure, and a corresponding coding tree unit (CTU).
Figure 2B:
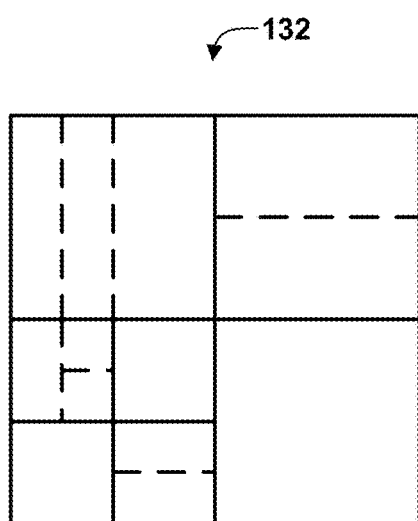

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

As introduced above, video encoder 200 and video decoder 300 may be configured to code blocks of video data in a merge mode, which is a mode for signaling inter-prediction motion information. The merge candidate list construction process in some example video codecs (e.g., HEVC and VVC) may introduce dependencies between neighboring blocks due to the use of spatial merge candidates. In some example video encoder implementations, the motion estimation stage (e.g., the motion estimation performed by motion estimation unit 222 of FIG. 3) for neighboring blocks is typically performed in parallel or at least pipelined to increase the throughput. Due to the dependency between neighboring blocks, merge candidate lists of neighboring blocks cannot be generated in parallel and may represent a bottleneck for parallel encoder/decoder designs.

Therefore, a parallel merge estimation process was introduced in HEVC. The parallel merge estimation process in HEVC uses an indication of a region (e.g., a MER) in which video encoder 200 and video decoder 300 may derive merge candidate lists for two or more blocks at the same time. Video encoder 200 and video decoder 300 may derive merge candidate lists for all blocks within a MER in parallel. In some examples, a MER may include a single block. That is, video encoder 200 (e.g., via motion estimation unit 222 and motion compensation unit 224) and video decoder 300 (e.g., via motion compensation unit 316) may perform a merge candidate list construction process in parallel for multiple blocks within the indicated region (e.g., the MER).

Video encoder 200 and video decoder 300 may determine blocks for which to perform the parallel merge candidate list construction process by checking whether a candidate block is inside the indicated MER. A candidate block that is in the same MER as the current block is not included in the merge candidate list. Hence, the motion data of such a candidate does not need to be available at the time of the merge candidate list construction.

Figure 3:
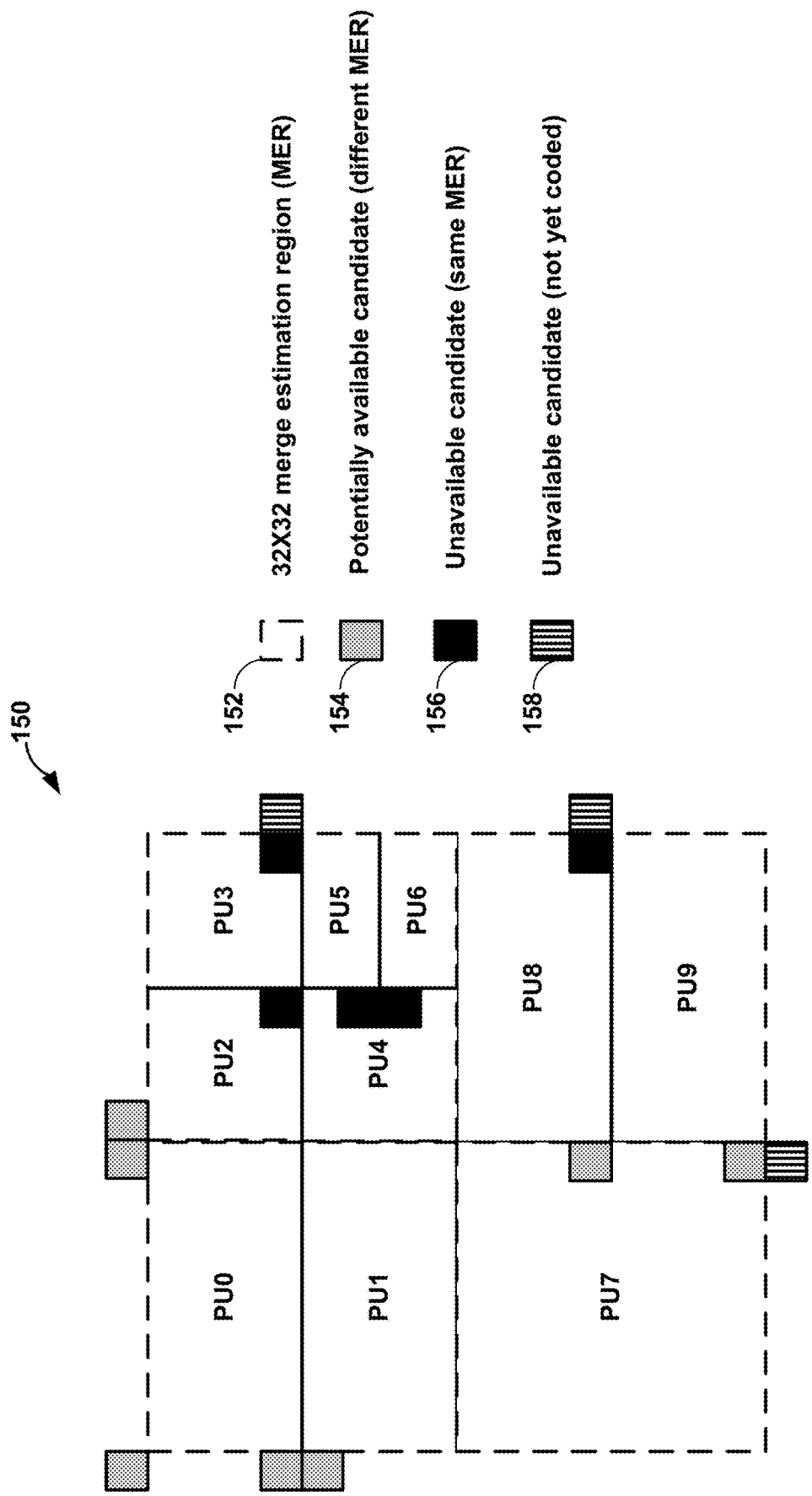
FIG. 3 is a conceptual diagram illustrating example merge estimation regions.

In examples where the size of the MER is 32×32 samples, video encoder 200 and video decoder 300 may be configured to construct the merge candidate lists in parallel for all blocks (e.g., coding units or prediction units) in a 32×32 sample area, since all merge candidates that are within the same 32×32 MER are not added in the merge candidate list. FIG. 3 illustrates an example partitioning of CTU 150 into seven CUs and ten PUs. A first CU includes PU0 and PU1, a second CU includes PU2, a third CU includes PU3, a fourth CU includes PU4, a fifth CU includes PU5 and PU6, a sixth CU includes PU7, and a seventh CU includes PU8 and PU9. In FIG. 3, CTU 150 includes a 64×64 luma coding tree block. Motion estimation for PUs inside 32×32 MERs 152 (dashed blocks) are carried out independently, enabling the performance of motion estimation (e.g., including merge candidate list construction) in parallel for PUs within each MER 152. For purposes of explanation, FIG. 3 shows possible spatial merge candidates for PU0, PU5, and PU9.

In the example of FIG. 3, merge candidates 154 for PU0 are available for use in a merge candidate list because those merge candidates are outside the 32×32 MER that includes PU0. For the 32×32 MER that encompasses PU2-PU6, the merge candidate lists of PU2-PU6 cannot include motion data from any of PU2-PU6 because the merge estimation and merge candidate list construction inside that MER should be independent (e.g., will be performed in parallel). Therefore, with reference to PU5, merge candidates 156 are unavailable because merge candidates 156 are in the same MER that encompasses PU5. Merge candidate 158 for PU5 is unavailable because that candidate location has not yet been coded. Accordingly, the merge list of PU5 may only include a temporal candidate (if available) and zero MV candidates. For PU9, merge candidates 154 are available because those merge candidates are outside the MER that encompasses PU9. Merge candidate 156 is unavailable because merge candidate 156 is in the same MER as PU9, and merge candidates 158 are not available because those candidate locations have not yet been coded.

In order to enable an encoder (e.g., video encoder 200) to trade-off parallelism and coding efficiency, the parallel merge estimation level (e.g., the size of the MER) may be adaptive and signaled using a syntax element. For example, video encoder 200 may signal a syntax element (e.g., log 2_parallel_merge_level_minus2) that indicates the size of the MER in a picture parameter set (PPS). The following MER sizes are allowed in HEVC: 4×4 (no parallel merge list construction possible), 8×8, 16×16, 32×32 and 64×64. A higher degree of parallelization, enabled by a larger MER, excludes more potential candidates from the merge candidate list. However, a larger MER may decrease coding efficiency.

HMVP in VVC Draft 7 prevents the parallelization of merge candidate list derivation. The HMVP merge candidates are added to the merge list after the spatial MVP and TMVP. In HMVP as implemented in VVC Draft 7, the motion information of a previously coded block is stored in a table and used as an MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate. For blocks being coded in parallel within a MER, however, the motion information of a previously coded block may not be known, thus resulting in either an inability to use HMVP or in a reduction of the parallelism achieved by a MER.

This disclosure describes processes for constraining the addition of HMVP candidates to the table of HMVPs when using MER, such that both HMVPs and MERs can be used in conjunction with one another. According to one technique of this disclosure, the updating of an HMVP table is constrained such that the associated motion information of the current block is added to the last entry of the HMVP table as a new HMVP candidate if and only if one of the following is true—(1) the size of current block is larger than or equal to the MER size or (2) the current block is located at a bottom-right corner of the current MER. Referring back to FIG. 3, PU1, PU6, PU7, and PU9 are examples of blocks that are at the bottom right of an MER.

For example, if implementing the first condition, video encoder 200 and video decoder 300 may be configured to store a table of HMVPs; determine motion information for a first block of the video data; add the motion information for the first block to the table of HMVPs in response to determining that the first block is larger than or equal to a size for the MER; and use the table of HMVPs to decode a second block of the video data. If implementing the second condition, video encoder 200 and video decoder 300 may be configured to store a table of HMVPs; determine motion information for a first block of the video data; add the motion information for the first block to the table of HMVPs in response to determining that the first block is located at a bottom-right corner of a MER; and use the table of HMVPs to decode a second block of the video data.

In some examples, the associated motion information of the current block is added to the last entry of the table as a new HMVP candidate if and only if one of the following is true:
3) cbWidth>=merSize and cbHeight>=merSize
4) floor(xCb/merSize)<floor ((xCb+cbWidth)/merSize) and floor(yCb/merSize)<floor((yCb+cbHeight)/merSize), where xCb and yCb are the coordinates of top-left sample in the current block, cbWidth and cbHeight are the width and height of the current block, and merSize is the size of MER. Floor(x) is the operator to get the maximum integer value that is smaller or equal to x. For example, video encoder 200 and video decoder 300 may be configured to determine if a value of an x-coordinate of a top-left sample of the first block plus a width of the first block divided by a size of the MER is greater than the value of the x-coordinate of the top-left sample divided by the size of the MER and determine if a value of a y-coordinate of a top-left sample of the first block plus a height of the first block divided by the size of the MER is greater than the value of the y-coordinate of the top-left sample divided by the size of the MER. Video encoder 200 and video decoder 300 may be configured to add the motion information for the first block to the table of HMVPs in response to determining that the value of an x-coordinate of the top-left sample of the first block plus a width of the first block divided by the size of the MER is greater than the value of the x-coordinate of the top-left sample divided by the size of the MER and in response to determining that the value of the y-coordinate of the top-left sample of the first block plus the height of the first block divided by the size of the MER is greater than the value of the y-coordinate of the top-left sample divided by the size of the MER.

In another example, the associated motion information of the current block is added to the last entry of the table as a new HMVP candidate if and only if one of the following is true:
3) cbWidth>=merSize and cbHeight>=merSize
4) floor(xCb/merSize)+1==floor ((xCb+cbWidth)/merSize) and floor(yCb/merSize)+1==floor ((yCb+cbHeight)/merSize).

In some examples of this disclosure, a second HMVP table may be maintained. When coding a current block that is inside a MER, the second table is used instead of the original table. And the second HMVP table is not updated with the associated motion information of the current block. The original HMVP table is updated with the associated motion information of the current block. When coding a current block that consists one or more MER, the original table is used.

In some examples, a second HMVP table is maintained. When coding a current block that is inside a MER, the second table is used instead of the original table. And the second HMVP table is not updated with the associated motion information of the current block. The original HMVP table is updated with the associated motion information of a limited number of blocks located at some specific positions inside the MER. In some examples, the original HMVP table is updated with the associated motion information of current block if the current block is located at the bottom-right corner of the current MER. In some examples, the original HMVP table is updated with the associated motion information of a current block if the current block is located at the center of the current MER. In some examples, the original HMVP table is updated with the associated motion information of the current block if the current block is located at the top-left corner of the current MER.

Figure 4:
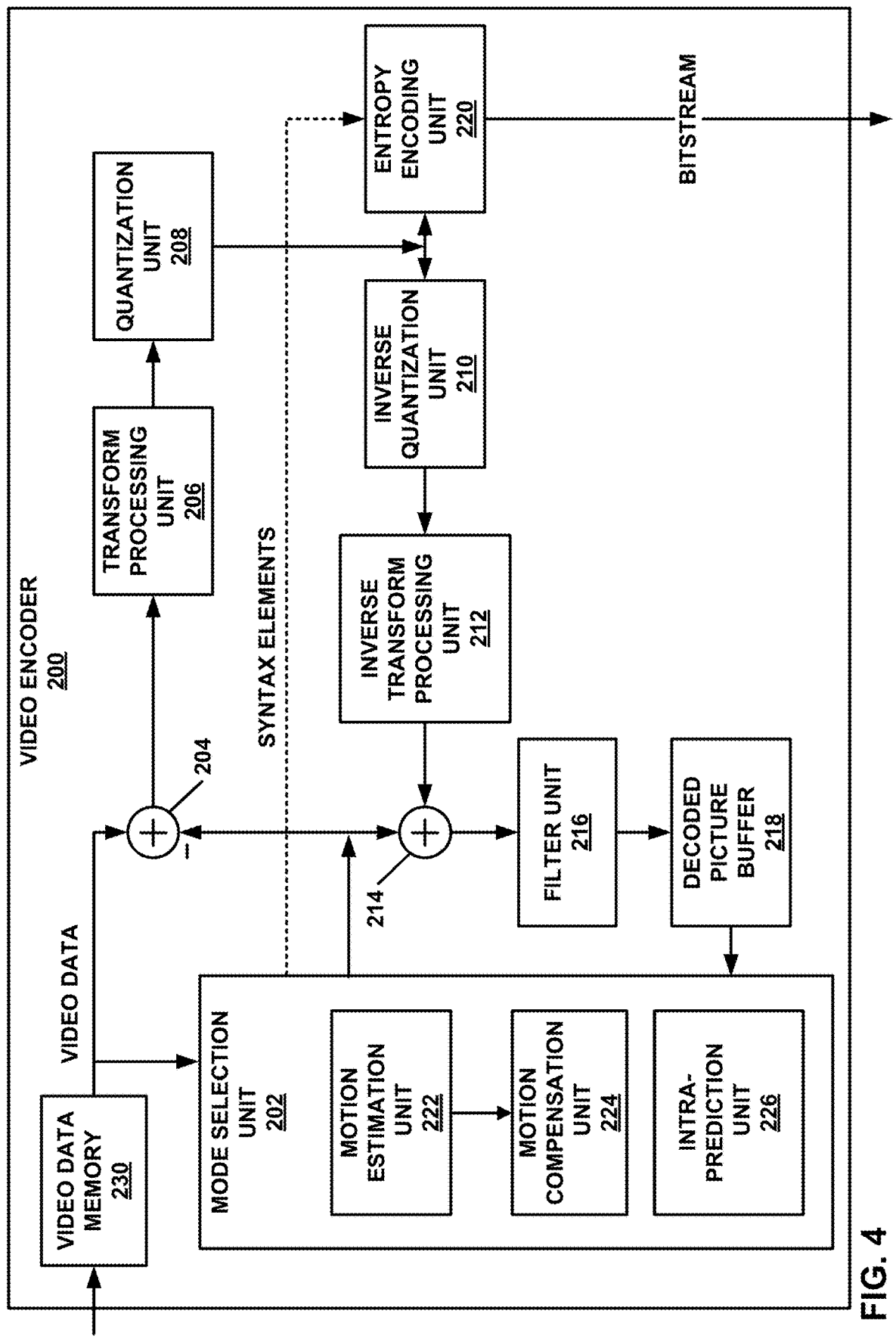
FIG. 4 is a block diagram illustrating an example video encoder that may perform the techniques of this disclosure.

FIG. 4 is a block diagram illustrating an example video encoder 200 that may perform the techniques of this disclosure. FIG. 4 is provided for purposes of explanation and should not be considered limiting of the techniques as broadly exemplified and described in this disclosure. For purposes of explanation, this disclosure describes video encoder 200 according to the techniques of JEM, VVC (ITU-T H.266, under development), and HEVC (ITU-T H.265). However, the techniques of this disclosure may be performed by video encoding devices that are configured to other video coding standards.

In the example of FIG. 4, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 4 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging. Motion estimation unit 222 and motion compensation unit 224 may be configured to code blocks using MERs as described above.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to perform the techniques of this disclosure. For example, mode selection unit 202 (e.g., motion estimation unit 222 and/or motion compensation unit 224) may store a table of HMVPs to be used when constructing merge candidate lists for blocks coded in merge mode. Mode selection unit 202 may determine motion information for a first block of the video data, add the motion information for the first block to the table of HMVPs in response to determining that the first block is located at a bottom-right corner of a MER, and use the table of HMVPs to decode a second block of the video data. Mode selection unit 202 may, for example, generate a merge candidate list for the second block using an entry from the table of HMVPs.

Figure 5:
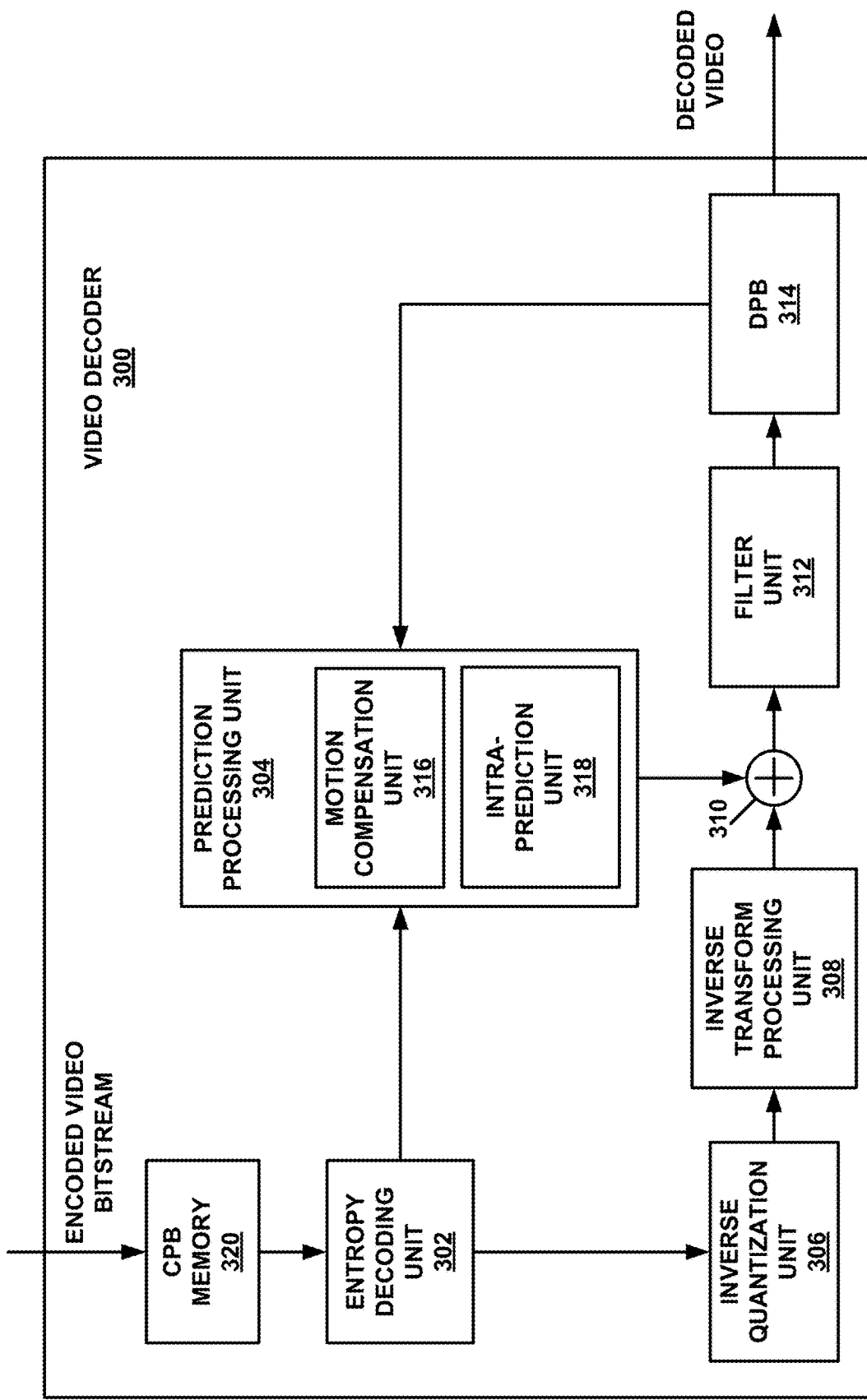
FIG. 5 is a block diagram illustrating an example video decoder that may perform the techniques of this disclosure.

FIG. 5 is a block diagram illustrating an example video decoder 300 that may perform the techniques of this disclosure. FIG. 5 is provided for purposes of explanation and is not limiting on the techniques as broadly exemplified and described in this disclosure. For purposes of explanation, this disclosure describes video decoder 300 according to the techniques of JEM, VVC (ITU-T H.266, under development), and HEVC (ITU-T H.265). However, the techniques of this disclosure may be performed by video coding devices that are configured to other video coding standards.

In the example of FIG. 5, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 5 are illustrated to assist with understanding the operations performed by video decoder 300. The units may be implemented as fixed-function circuits, programmable circuits, or a combination thereof. Similar to FIG. 4, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 4). Motion compensation unit 316 may be configured to decode blocks using MERs as described above.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 4). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Video decoder 300 represents an example of a device configured to decode video data including a memory configured to store video data, and one or more processing units implemented in circuitry and configured to perform the techniques of this disclosure. For example, prediction processing unit 304 (e.g., motion compensation unit 316) may store a table of HMVPs to be used when constructing merge candidate lists for blocks coded in merge mode. Prediction processing unit 304 may determine motion information for a first block of the video data, add the motion information for the first block to the table of HMVPs in response to determining that the first block is located at a bottom-right corner of a MER, and use the table of HMVPs to decode a second block of the video data. prediction processing unit 304 may, for example, generate a merge candidate list for the second block using an entry from the table of HMVPs.

Figure 6:
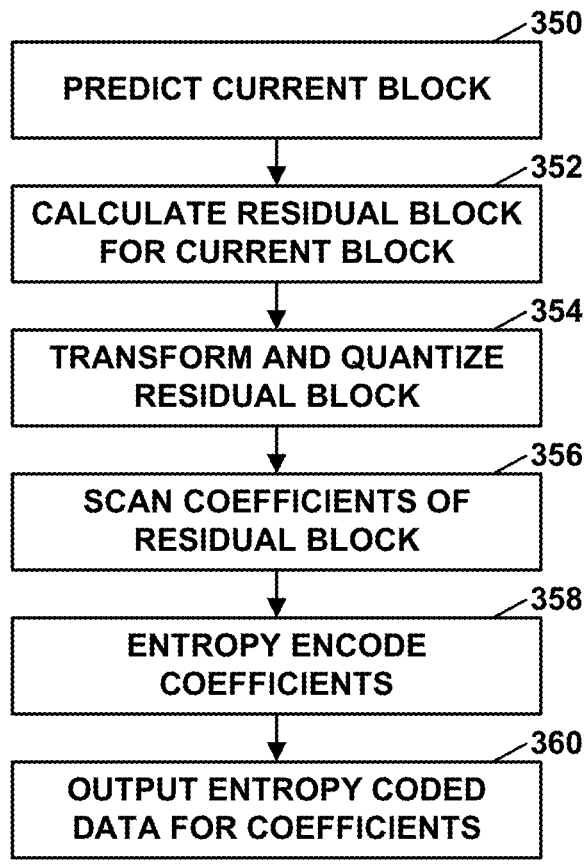
FIG. 6 is a flowchart illustrating an example video encoding process.

FIG. 6 is a flowchart illustrating an example process for encoding a current block. The current block may comprise a current CU. Although described with respect to video encoder 200 (FIGS. 1 and 4), it should be understood that other devices may be configured to perform a process similar to that of FIG. 6.

In this example, video encoder 200 initially predicts the current block (350). As part of predicting the block, video encoder 200 may maintain one or more HMVP tables as disclosed herein and may update those tables according to the techniques described herein. For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 7:
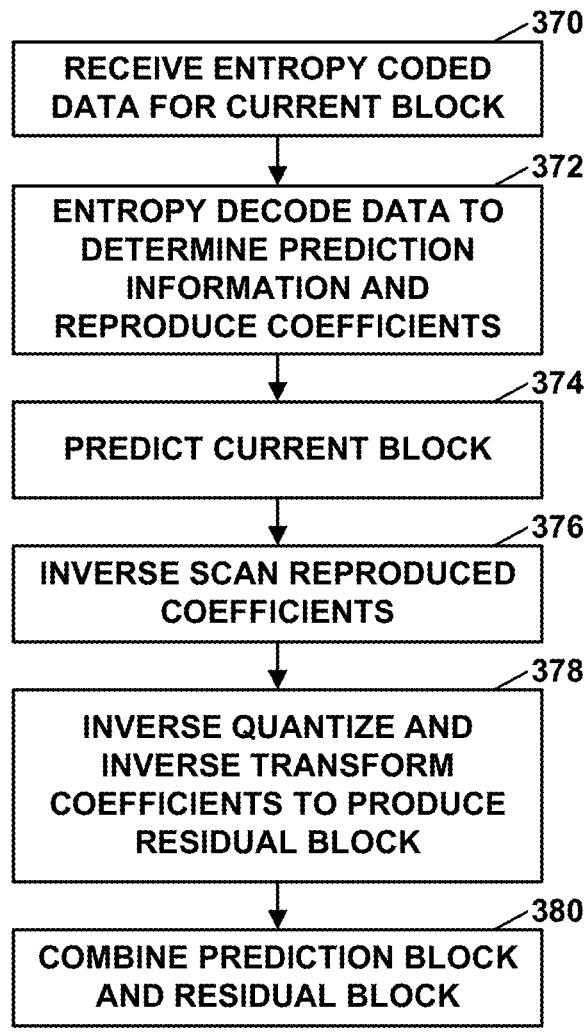
FIG. 7 is a flowchart illustrating an example video decoding process.

FIG. 7 is a flowchart illustrating an example process for decoding a current block of video data. The current block may comprise a current CU. Although described with respect to video decoder 300 (FIGS. 1 and 5), it should be understood that other devices may be configured to perform a process similar to that of FIG. 7.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. As part of predicting the block, video decoder 300 may maintain one or more HMVP tables as disclosed herein and may update those tables according to the techniques described herein. Video decoder 300 may then inverse scan the reproduced coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

Figure 8:
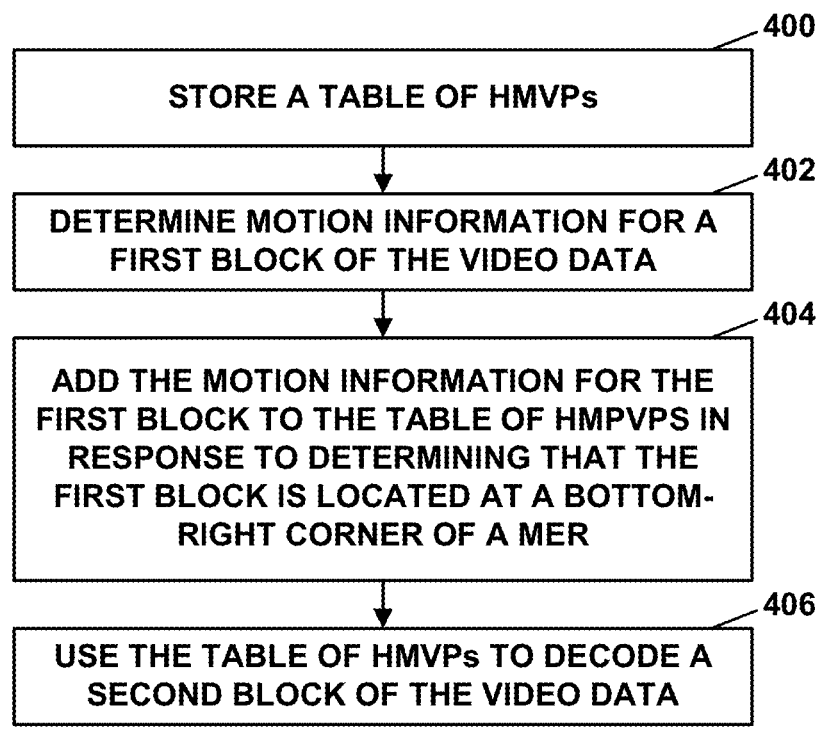
FIG. 8 is a flowchart illustrating an example video decoding process.

FIG. 8 is a flowchart illustrating an example process for decoding a current block of video data. The current block may comprise a current CU. The techniques of FIG. 8 will be described with respect to a generic video decoder, which may, for example, correspond to video decoder 300 (FIGS. 1 and 5), the video decoding loop of video encoder 200 (FIGS. 1 and 4), or any other such video decoder.

The video decoder stores a table of HMVPs (400). The video decoder may, for example, maintain a table of HMVPs, and as new blocks are decoded, the video decoder may add the motion information used to decode the new blocks to the table of HMVPs. The decoder may also periodically remove entries from the table of HMVPs, so as to limit the size of the table. The video decoder determines motion information for a first block of the video data (402). The video decoder may, for example, use the determined motion information to inter predict the first block.

The video decoder adds the motion information for the first block to the table of HMVPs in response to determining that the first block is located at a bottom-right corner of a MER (404). The MER may be a first MER, and the second block may belong to a second MER. To add the motion information for the first block to the table of HMVPs in response to determining that the first block is located at the bottom-right corner of the MER, the video decoder may for example, determine if a value of an x-coordinate of a top-left sample of the first block plus a width of the first block divided by a size of the MER is greater than the value of the x-coordinate of the top-left sample divided by the size of the MER and determine if a value of a y-coordinate of a top-left sample of the first block plus a height of the first block divided by the size of the MER is greater than the value of the y-coordinate of the top-left sample divided by the size of the MER. In response to determining that the value of an x-coordinate of the top-left sample of the first block plus a width of the first block divided by the size of the MER is greater than the value of the x-coordinate of the top-left sample divided by the size of the MER and in response to determining that the value of the y-coordinate of the top-left sample of the first block plus the height of the first block divided by the size of the MER is greater than the value of the y-coordinate of the top-left sample divided by the size of the MER, the video decoder may add the motion information for the first block to the table of HMVPs.

The video decoder uses the table of HMVPs to decode a second block of the video data (406). To use the table of HMVPs to decode the second block of the video data, the video decoder may, for example, be configured to generate a candidate list of motion information for the second block that includes a candidate from the table of HMVPs; select a candidate from the candidate list of motion vectors; and use the selected candidate to decode the second block of video data. The video decoder may, for example, output decoded video data that includes decoded versions of the first block and the second block. In implementations where the video decoder is operating to perform a video encoding process, the video decoder may store one or more decoded picture that include decoded versions of the first block and the second block and use the one or more stored decoded pictures to encode other blocks of other pictures of the video data.

The following clauses represents example implementations of the techniques and devices introduced above.

Clause 1: A method of coding video data includes storing a table of history-based motion vector predictors (HMVPs); determining motion information for a current block of video data; and updating the table of history-based motion vector predictors based on the determined motion information for the current block according to any technique or combination of techniques described in this disclosure.

Clause 2: The method of clause 1, wherein updating the table of HMVPs based on the determined motion information for the current block comprises: adding the motion information for the current block to the table of HMVPs in response to determining that the current block is larger than or equal to a size for a motion estimation region.

Clause 3: The method of clause 1, wherein updating the table of HMVPs based on the determined motion information for the current block comprises: adding the motion information for the current block to the table of HMVPs in response to determining that the current block is located at a bottom-right corner of a motion estimation region.

Clause 4: The method of any of clauses 1-3, further includes for a second current block being coded after the current block, generating a candidate list for the second current block by adding a candidate from the table of HMVPs to the candidate list.

Clause 5: A method of coding video data includes storing a first table of history-based motion vector predictors (HMVPs); storing a second table of HMVPs; determining motion information for a current block of video data; and updating the first table of HMVPs and/or the second table of HMVPs based on the determined motion information for the current block according to any technique or combination of techniques described in this disclosure.

Clause 6: The method of clause 5, further includes for a second current block being coded after the current block, generating a candidate list for the second current block by adding a candidate from the first table of HMVPs or the second table of HMVPs to the candidate list.

Clause 7: The method of any of clauses 1-6, wherein coding comprises decoding.

Clause 8: The method of any of clauses 1-6, wherein coding comprises encoding.

Clause 9: A device for coding video data, the device comprising one or more means for performing the method of any of clauses 1-8.

Clause 10: The device of clause 9, wherein the one or more means comprise one or more processors implemented in circuitry.

Clause 11: The device of any of clauses 9 and 10, further comprising a memory to store the video data.

Clause 12: The device of any of clauses 9-11, further comprising a display configured to display decoded video data.

Clause 13: The device of any of clauses 9-12, wherein the device comprises one or more of a camera, a computer, a mobile device, a broadcast receiver device, or a set-top box.

Clause 14: The device of any of clauses 9-13, wherein the device comprises a video decoder.

Clause 15: The device of any of clauses 9-14, wherein the device comprises a video encoder.

Clause 16: A computer-readable storage medium having stored thereon instructions that, when executed, cause one or more processors to perform the method of any of clauses 1-8.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, application specific integrated circuits ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   (a) storing a table of history-based motion vector predictors (HMVPs);
   (b) determining motion information for a first block of the video data;
   (c) determining that the first block is located at a bottom-right corner of a motion estimation region (MER);
   (d) determining if a value of (an x-coordinate of a top-left sample of the first block plus a width of the first block divided by a size of the MER) is greater than (the value of the x-coordinate of the top-left sample divided by the size of the MER);
(e) determining if a value of (a y-coordinate of a top-left sample of the first block plus a height of the first block divided by the size of the MER) is greater than (the value of the y-coordinate of the top-left sample divided by the size of the MER);
adding the motion information for the first block to the table of HMVPs in response to (c), (d) and (e) being true; and
using the table of HMVPs to decode a second block of the video data.

2. The method of claim 1, wherein using the table of HMVPs to decode the second block of the video data comprises:
for the second block, generating a candidate list of motion information, wherein the candidate list includes a candidate from the table of HMVPs;
selecting a candidate from the candidate list of motion vectors; and
using the selected candidate to decode the second block of video data.

3. The method of claim 1, wherein the MER is a first MER, and wherein the second block belongs to a second MER.

4. The method of claim 1, wherein
the determining if a value of (an x-coordinate of a top-left sample of the first block plus a width of the first block divided by a size of the MER) is greater (the value of the x-coordinate of the top-left sample divided by the size of the MER) is represented as floor(xCb/merSize)<floor((xCb+cbWidth)/merSize), wherein the determining if a value of (a y-coordinate of a top-left sample of the first block plus a height of the first block divided by the size of the MER) is greater than (the value of the y-coordinate of the top-left sample divided by the size of the MER) is represented as floor(yCb/merSize)<floor((yCb+cbHeight)/merSize),
wherein the xCb represents the x-coordinate of the top-left sample of the first block,
the yCb represents the y-coordinate of the top-left sample of the first block,
the cbWidth represents the width of the first block,
the cbHeight represents the height of the first block,
the merSize represents the size of the MER,
< represents a less than operation, and
the floor( ) represents a floor operation.

5. The method of claim 1, further comprising:
outputting decoded video data that includes decoded versions of the first block and the second block.

6. The method of claim 1, wherein the method of decoding is performed as part of a video encoding process, the method further comprising:
storing one or more decoded picture that include decoded versions of the first block and the second block; and
using the one or more stored decoded pictures to encode other blocks of other pictures of the video data.

7. A device for decoding video data, the device comprising:
a memory configured to store video data; and
one or more processors implemented in circuitry and configured to:
(a) store a table of history-based motion vector predictors (HMVPs);
(b) determine motion information for a first block of the video data;
(c) determine that the first block is located at a bottom-right corner of a motion estimation region (MER);
(d) determine if a value of (an x-coordinate of a top-left sample of the first block plus a width of the first block divided by a size of the MER) is greater than (the value of the x-coordinate of the top-left sample divided by the size of the MER);
(e) determine if a value of (a y-coordinate of a top-left sample of the first block plus a height of the first block divided by the size of the MER) is greater than (the value of the y-coordinate of the top-left sample divided by the size of the MER);
add the motion information for the first block to the table of HMVPs in response to (c), (d) and (e) being true; and
use the table of HMVPs to decode a second block of the video data.

8. The device of claim 7, wherein to use the table of HMVPs to decode the second block of the video data, the one or more processors are further configured to:
for the second block, generate a candidate list of motion information, wherein the candidate list includes a candidate from the table of HMVPs;
select a candidate from the candidate list of motion vectors; and
use the selected candidate to decode the second block of video data.

9. The device of claim 7, wherein the MER is a first MER, and wherein the second block belongs to a second MER.

10. The device of claim 7, wherein
the determine if a value of (an x-coordinate of a top-left sample of the first block plus a width of the first block divided by a size of the MER) is greater (the value of the x-coordinate of the top-left sample divided by the size of the MER) is represented as floor(xCb/merSize)<floor((xCb+cbWidth)/merSize), wherein the determine if a value of (a y-coordinate of a top-left sample of the first block plus a height of the first block divided by the size of the MER) is greater than (the value of the y-coordinate of the top-left sample divided by the size of the MER) is represented as floor(yCb/merSize)<floor((yCb+cbHeight)/merSize),
wherein the xCb represents the x-coordinate of the top-left sample of the first block,
the yCb represents the y-coordinate of the top-left sample of the first block,
the cbWidth represents the width of the first block,
the cbHeight represents the height of the first block,
the merSize represents the size of the MER,
< represents a less than operation, and
the floor( ) represents a floor operation.

11. The device of claim 7, wherein the one or more processors are further configured to:
output decoded video data that includes decoded versions of the first block and the second block.

12. The device of claim 7, wherein the device comprise a video encoder and wherein the one or more processors are further configured to:
store one or more decoded picture that include decoded versions of the first block and the second block; and
use the one or more stored decoded pictures to encode other blocks of other pictures of the video data.

13. The device of claim 7, wherein the device comprises a wireless communication device, further comprising a receiver configured to receive encoded video data.

14. The device of claim 13, wherein the wireless communication device comprises a telephone handset and wherein the receiver is configured to demodulate, according to a wireless communication standard, a signal comprising the encoded video data.

15. The device of claim 7, further comprising:
a display configured to display decoded video data.

16. The device of claim 7, wherein the device comprises one or more of a camera, a computer, a mobile device, a broadcast receiver device, or a set-top box.

17. The device of claim 7, wherein the device comprises a wireless communication device, further comprising a transmitter configured to transmit encoded video data.

18. The device of claim 17, wherein the wireless communication device comprises a telephone handset and wherein the transmitter is configured to modulate, according to a wireless communication standard, a signal comprising the encoded video data.

19. The device of claim 7, further comprising:
a camera configured to capture the video data.

20. A computer-readable storage medium storing instructions that when executed by one or more processors cause the one or more processors to:
(a) store a table of history-based motion vector predictors (HMVPs);
(b) determine motion information for a first block of the video data;
(c) determine that the first block is located at a bottom-right corner of a motion estimation region (MER);
(d) determine if a value of (an x-coordinate of a top-left sample of the first block plus a width of the first block divided by a size of the MER) is greater than (the value of the x-coordinate of the top-left sample divided by the size of the MER);
(e) determine if a value of (a y-coordinate of a top-left sample of the first block plus a height of the first block divided by the size of the MER) is greater than (the value of the y-coordinate of the top-left sample divided by the size of the MER);
add the motion information for the first block to the table of HMVPs in response to (c), (d) and (e) being true; and use the table of HMVPs to decode a second block of the video data.

21. The computer-readable storage medium of claim 20, wherein to use the table of HMVPs to decode the second block of the video data, the instruction cause the one or more processors to:
for the second block, generate a candidate list of motion information, wherein the candidate list includes a candidate from the table of HMVPs;
select a candidate from the candidate list of motion vectors; and
use the selected candidate to decode the second block of video data.

22. The computer-readable storage medium of claim 20, wherein the MER is a first MER, and wherein the second block belongs to a second MER.

23. The computer-readable storage medium of claim 20, wherein
the determine if a value of (an x-coordinate of a top-left sample of the first block plus a width of the first block divided by a size of the MER) is greater (the value of the x-coordinate of the top-left sample divided by the size of the MER) is represented as floor($x$Cb/merSize)<floor(($x$Cb+cbWidth)/merSize), wherein the determine if a value of (a y-coordinate of a top-left sample of the first block plus a height of the first block divided by the size of the MER) is greater than (the value of the y-coordinate of the top-left sample divided by the size of the MER) is represented as floor($y$Cb/merSize)<floor(($y$Cb+cbHeight)/merSize),
wherein the xCb represents the x-coordinate of the top-left sample of the first block,
the yCb represents the y-coordinate of the top-left sample of the first block,
the cbWidth represents the width of the first block,
the cbHeight represents the height of the first block,
the merSize represents the size of the MER,
< represents a less than operation, and
the floor( ) represents a floor operation.

* * * * *